Sept. 17, 1957  M. A. ENRIGHT  2,806,933
BRAZING HOUSING
Filed May 11, 1955

INVENTOR.
Maurice A. Enright
BY
Clyde H. Haynes
his atty

United States Patent Office 2,806,933
Patented Sept. 17, 1957

2,806,933

BRAZING HOUSING

Maurice A. Enright, Lorain, Ohio, assignor to Gregory Industries, Inc., Detroit, Mich., a corporation of Michigan Application May 11, 1955, Serial No. 507,554

4 Claims. (Cl. 219—99)

This invention relates to a shield or housing for aiding the brazing of a terminal to a plate or member by means of a brazing pin.

In the patent application, Serial No. 416,343, filed March 15, 1954, by Roger W. Sholle et al., a device and method for brazing terminals to a work plate, such as a rail bond terminal to a rail, was disclosed. It has been found that the present housing ensures that good results will be obtained on rail as well as on volatile coated materials. For example, if a nonferrous terminal is to be brazed to a galvanized pipe or plate using a brazing pin having a silver alloy tip, the present housing ensures that good brazes can be obtained.

An arc causes formation of excessive gases when drawn on galvanized plate as compared to the gases caused by drawing the arc on nongalvanized material. These gases must be accommodated at the time they are formed to obtain good brazed joints between the terminal and the pin and the member.

Thus, one of the objects is to provide a housing which aids the brazing of a terminal to a galvanized member and permits proper venting of gases during the brazing operation.

Another object of the invention is to provide a housing which substantially encloses the terminal being brazed to retain the heat created by an arc formed inside the housing while providing the necessary venting of gases.

A further object of the invention is to provide a housing for use in brazing terminals to members or plates having a volatile metallic coating and which can also be used in brazing terminals to members or plates devoid of a volatile coating.

Other objects and a full understanding of the invention will become apparent from the description and claims and the drawings in which:

Figure 1:
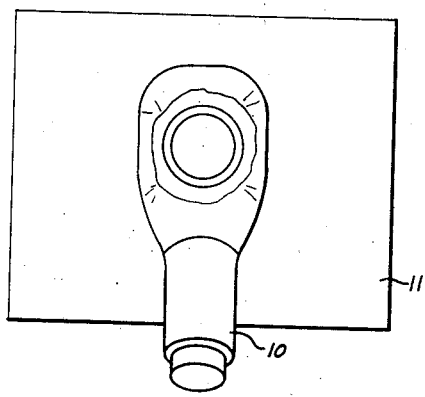
Figure 1 is an elevational view of a terminal brazed to a plate.
Figure 2:
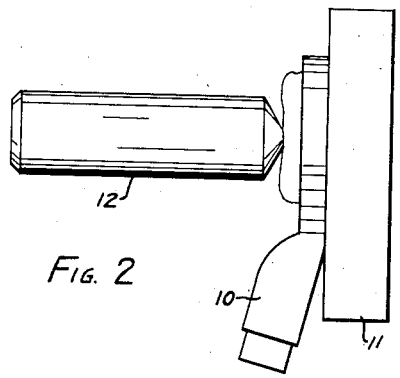
Figure 2 is a side view of a terminal brazed to a plate.
Figure 3:
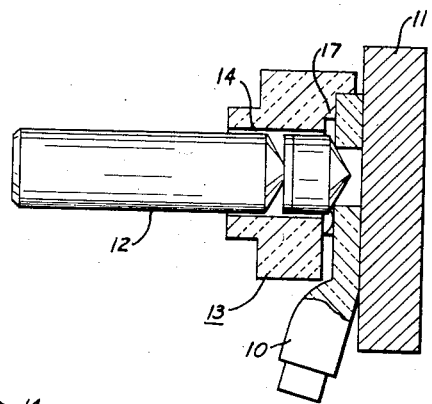
Figure 3 is a side view partly in section illustrating a brazing housing in position for brazing the terminal to the plate.

An example of the finished product obtained from using the housing described herein for brazing a terminal to a plate is illustrated in Figures 1 and 2. In Figures 1 and 2 the reference character 10 represents a terminal which is brazed to a plate 11, which may have a galvanized or volatile coating thereon. In these views the brazing stud has not been broken from the terminal and plate after the brazing was completed. The device for brazing the terminal to the plate includes brazing stud 12 and the heat resistant housing or shield 13 as illustrated in Figure 3. In using the brazing device the housing 13 substantially encloses the terminal 10 and holds it next to the work plate 11. The brazing stud 12 is slidable in an opening 14 in the housing or shield 13 and is connectable to a source of electrical current. In actual practice electrical connection is made by inserting the brazing stud 12 in a stud welding gun such as that illustrated in Patent No. 2,413,189, issued to T. Nelson, December 24, 1946. The work or plate 11 may be connected to the ground or the opposite side of the source of welding current by any suitable manner so that an arc may be established either between the brazing stud 12 and the terminal 10 or between the brazing stud 12 and the plate 11. An arc established within the housing 13 and at the end of brazing stud 12 melts the brazing material therein, causing it to braze the terminal 10 to the work or plate 11.

Figure 4:
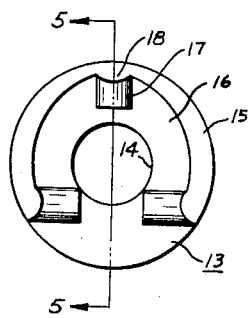
Figure 4 is a plan view of the heat resistant housing used in the device.
Figure 5:
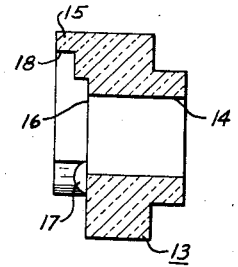
Figure 5 is a sectional view taken along the line 5—5 of Figure 4.
Figure 6:
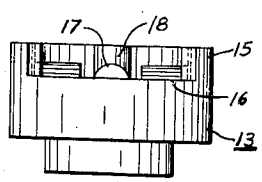
Figure 6 is a front view of the housing of Figure 4.

The housing 13, which is used in brazing a terminal to a plate, comprises a body of heat resistant material having a bottom surface 16 and a peripheral somewhat horseshoe shaped side wall portion 15 extending outwardly beyond the bottom surface 16 and defining a terminal receiving recess. The body portion and the somewhat horseshoe shaped side wall portion 15 are integrally joined with each other. As illustrated in Figures 4, 5 and 6, the bottom surface 16 has raised projections 17 and the side wall portion has raised projections 18 at predetermined locations. These raised projections are integral with the respective side wall and bottom surface portions of the shield 13, and extend outwardly therefrom into the recess a predetermined distance and at predetermined locations. The projections 17 and 18 are engageable with a terminal 10 when it is placed in the recess to space the terminal 10 from the bottom surface 16 and the peripheral wall 15 to provide a gas escapement passage around the terminal and thus between the terminal 10 and the shield 13.

The side wall portion 15 extends outwardly from the bottom surface 16 and the raised projection 17 and terminates in a smooth end surface or edge, positioned at a distance from the projections on the bottom surface less than the thickness of a terminal with which the shield 13 is to be used. As is illustrated in Figure 3, the smooth edge of the wall is at a spaced distance from the work plate 11 sufficient to ensure that the projections 17 seat the terminal 10 against the surface of the work plate 11.

The brazing pin receiving opening 14 in the body portion of the housing 13 extends transverse to the bottom surface 16 and opens thereon. This brazing pin receiving opening 14 is sufficiently long to align a brazing pin such as pin 12 in operative relationship with the terminal and the member or work plate 11.

When a terminal is brazed to a galvanized plate, there is a tendency for more gas to be formed by the brazing operation than when the terminal is brazed to a plate which does not have galvanized surfaces. It has been discovered that contrary to expectations this same shield can be used effectively when brazing terminals to plates which do not have a galvanized surface as well as aiding the brazing of terminals to galvanized plates. The projections are aligned and positioned at predetermined positions so that they will receive the terminal between them and hold the side walls and bottom surfaces of the housing in proper brazing relationship with the terminal and the pin which is used to braze the terminal to the work.

It is understood that if terminals of various shapes or sizes are to be brazed to work plates, shields or housing 13 must be of various sizes to accommodate each of these various terminals. The housings 13 are preferably constructed of a ceramic or clay material which provides them with the necessary heat resistant qualities for the purpose.

Although this invention has been described in its preferred form with a certain degree of particularity enabling others to reproduce the invention, it is understood that the present disclosure has been made by way of example and that numerous modifications and changes in the details may be resorted to without departing from the spirit and scope of the invention as defined in the claims which are made a part hereof.

The embodiments of the invention in which an exclusive property or privilege is claimed are defined as follows:

1. A housing for aiding the brazing of a terminal to a member by establishing an arc at the end of a brazing pin to melt the end of the pin and allowing the molten material to join the terminal to the member, said housing comprising, a body portion of heat resistant material having a bottom surface and a peripheral somewhat horseshoe shaped side wall portion extending outwardly beyond said bottom surface and integrally joined with said body portion, raised projections on said bottom surface and said side wall portion at predetermined locations and engageable with a terminal to space the terminal from the bottom surface and the side wall to provide a gas escapement passage, said side wall terminating at a distance from the projections on the bottom surface less than the thickness of a terminal to prevent seating of the housing aaginst the member to which the terminal is being brazed, said body portion also having a brazing pin receiving opening transverse to the bottom surface and sufficiently long to align a brazing pin in operative relationship with the terminal and member and to enclose an arc established therebetween.

2. A housing for aiding the brazing of a terminal to a member by establishing an arc at the end of a brazing pin to melt the end of the pin and allowing the molten material to join the terminal to the member, said housing comprising, a body portion of heat resistant material having a bottom surface and a peripheral somewhat horseshoe shaped side wall portion extending outwardly beyond said bottom surface and integrally joined with said body portion, raised projections on said bottom surface and said side wall portion at predetermined locations and engageable with a terminal to space the terminal from the bottom surface and the side wall to provide a gas escapement passage, said side wall terminating in a smooth edge surface positioned at a distance from the projections on the bottom surface less than the thickness of a terminal to prevent seating of the housing against the member to which the terminal is being brazed, said body portion also having a brazing pin receiving opening transverse to the bottom surface and sufficiently long to align a brazing pin in operative relationship with the terminal and member and to enclose an arc established therebetween.

3. A housing for aiding the brazing of a terminal to a member by establishing an arc at the end of a brazing pin to melt the end of the pin and allowing the molten material to join the terminal to the member, said housing comprising, a body portion of heat resistant material having a bottom surface and a peripheral somewhat horseshoe shaped side wall portion extending outwardly beyond said bottom surface and integrally joined with said body portion, said side wall portion terminating in a smooth edge extending parallel to the bottom surface and positioned at a definite distance therefrom, raised projections on said bottom surface and said side wall portion aligned for engagement with a terminal placed within the wall portion to space the terminal from the side wall and the bottom surface for escapement of gases formed by brazing, said body portion also having a brazing pin receiving opening therethrough and transverse to and opening on said bottom surface and adapted to enclose an arc established within the body portion and at the end of the brazing pin.

4. A housing for aiding the brazing of a terminal to a member by establishing an arc at the end of a brazing pin to melt the end of the pin and allowing the molten material to join the terminal to the member, said housing comprising, a body portion of heat resistant material having a bottom surface and a peripheral somewhat horseshoe shaped side wall portion extending outwardly beyond said bottom surface and integrally joined with said body portion, said side wall portion terminating at a definite distance from said bottom surface, raised portions of said bottom surface and said side wall portion aligned for engagement with a terminal placed within the wall portion to space the terminal from the side wall and the bottom surface for escapement of gases formed by brazing, said body portion also having a brazing pin receiving opening therethrough and transverse to and opening on said bottom surface and adapted to enclose an arc established within the body portion and at the end of the brazing pin.

References Cited in the file of this patent

UNITED STATES PATENTS

| | | |
|---|---|---|
| 1,209,742 | Mead | Dec. 26, 1916 |
| 2,014,278 | Caldwell | Sept. 10, 1935 |
| 2,416,204 | Nelson | Feb. 18, 1947 |
| 2,493,283 | Evans | Jan. 3, 1950 |